United States Patent
Lutz et al.

(10) Patent No.: US 11,945,976 B2
(45) Date of Patent: Apr. 2, 2024

(54) HEAT-SEALABLE STRUCTURE FOR ALUMINUM DISPOSABLE BEVERAGE-BREWING CONTAINERS

(71) Applicant: Amcor Flexibles Rorschach AG, Goldach (CH)

(72) Inventors: Jürg Lutz, Rorschacherberg (CH); Marc Schaerer, Rorschach (CH); Barbara Lohs, Altach (AT); Bianca Krohn, Arbon (CH); Patrik Benz, Moerschwil (CH)

(73) Assignee: AMCOR FLEXIBLES RORSCHACH AG, Goldach (CH)

( * ) Notice: Subject to any disclaimer, the term of this patent is extended or adjusted under 35 U.S.C. 154(b) by 1049 days.

(21) Appl. No.: 16/825,592

(22) Filed: Mar. 20, 2020

(65) Prior Publication Data

US 2020/0239748 A1 Jul. 30, 2020

Related U.S. Application Data

(63) Continuation of application No. 15/312,401, filed as application No. PCT/EP2015/060563 on May 13, 2015, now abandoned.

(30) Foreign Application Priority Data

May 27, 2014 (EP) ..................................... 14169970

(51) Int. Cl.
| | | |
|---|---|---|
| *C09J 133/10* | (2006.01) | |
| *C08L 23/14* | (2006.01) | |
| *C08L 27/04* | (2006.01) | |
| *C08L 31/04* | (2006.01) | |
| *C08L 33/10* | (2006.01) | |
| *C09J 5/06* | (2006.01) | |
| *C09J 127/06* | (2006.01) | |
| *C09J 151/00* | (2006.01) | |
| *C09J 153/00* | (2006.01) | |
| *B32B 27/30* | (2006.01) | |
| *B32B 37/08* | (2006.01) | |
| *B32B 37/12* | (2006.01) | |
| *C09J 123/14* | (2006.01) | |
| *C09J 131/04* | (2006.01) | |

(52) U.S. Cl.
CPC ............. *C09J 133/10* (2013.01); *C08L 23/14* (2013.01); *C08L 27/04* (2013.01); *C08L 31/04* (2013.01); *C08L 33/10* (2013.01); *C09J 5/06* (2013.01); *C09J 127/06* (2013.01); *C09J 151/003* (2013.01); *C09J 153/00* (2013.01); *B32B 27/30* (2013.01); *B32B 37/08* (2013.01); *B32B 37/1207* (2013.01); *B32B 37/1284* (2013.01); *C09J 123/147* (2013.01); *C09J 131/04* (2013.01); *Y10T 156/10* (2015.01); *Y10T 428/31699* (2015.04)

(58) Field of Classification Search
CPC . C09J 133/10; C09J 5/06; C09J 127/06; C09J 151/003; C09J 153/00; C09J 123/147; C09J 131/04; C08L 23/14; C08L 27/04; C08L 31/04; C08L 33/10; C08L 27/08; C08L 51/04; C08L 53/00; B32B 27/30; B32B 37/08; B32B 37/1207; B32B 37/1284; B32B 27/00; Y10T 156/10; Y10T 428/31699; C08J 5/18
See application file for complete search history.

(56) References Cited

U.S. PATENT DOCUMENTS

| | | | |
|---|---|---|---|
| 3,201,498 A | 8/1965 | Brunson et al. | |
| 3,211,808 A | 10/1965 | Young et al. | |
| 3,270,090 A | 8/1966 | Nowak | |
| 4,136,202 A | 1/1979 | Farve | |
| 4,503,123 A * | 3/1985 | Ou-Yang | C09J 7/22 525/227 |
| 4,567,986 A | 2/1986 | Eastwood | |
| 4,753,708 A * | 6/1988 | Markert | C09D 157/00 428/522 |

(Continued)

FOREIGN PATENT DOCUMENTS

| | | |
|---|---|---|
| CN | 102700819 A | 10/2012 |
| EP | 0 129 178 B1 | 8/1987 |

(Continued)

OTHER PUBLICATIONS

U.S. Appl. No. 15/312,401, filed Nov. 18, 2016, Abandoned.
U.S. Appl. No. 16/805,718, filed Feb. 29, 2020, Pending.
Keles, et al., Aluminum foil: Its typical quality problems and their causes, Journal of Materials Processing Technology, 186, 2007, pp. 125-137.

(Continued)

*Primary Examiner* — Daniel H Lee

(57) ABSTRACT

The present invention relates to a heat-sealable structure comprising an aluminum foil and a heat-seal lacquer, said structure exhibiting a seal strength, according to ASTM F2824, of more than 23 N/15 mm when heat-sealed to another heat-sealable structure comprising an aluminum foil and the same heat-seal lacquer, the heat-seal lacquers of both structures contacting each other for heat sealing, said seal lacquer comprising a copolymer blend comprising: —from 30 to 80% by weight, preferably 40 to 70% by weight, more preferably from 50 to 60% by weight of a copolymer A based on (meth)acrylate ester (co)polymers, olefin (co) polymers and block or grafted copolymers comprising (met) acrylate ester sequences and olefin sequences, —from 20 to 70% by weight, preferably 30 to 60% by weight, more preferably from 40 to 50% by weight of a copolymer (B) based on vinyl halides, vinyl esters of carboxylic acids and ethylenically unsaturated (poly)carboxylic acids.

6 Claims, No Drawings

(56) References Cited

U.S. PATENT DOCUMENTS

| | | |
|---|---|---|
| 5,385,967 A | 1/1995 | Bauer et al. |
| 5,656,311 A | 8/1997 | Fond |
| 5,877,259 A | 3/1999 | Kveglis et al. |
| 8,474,368 B2 | 7/2013 | Kilber et al. |
| 2002/0050493 A1 | 5/2002 | Ball et al. |
| 2004/0116567 A1 | 6/2004 | Schmitt et al. |
| 2004/0142133 A1 | 7/2004 | De Coninck et al. |
| 2006/0025552 A1 | 2/2006 | Kaiser et al. |
| 2006/0057315 A1 | 3/2006 | De Coninck et al. |
| 2008/0057205 A1 | 3/2008 | Lohden et al. |
| 2008/0292893 A1* | 11/2008 | Loehden ............... C08L 51/06 428/458 |
| 2012/0119418 A1 | 5/2012 | Verbeek et al. |
| 2013/0202864 A1 | 8/2013 | Akai et al. |
| 2017/0081569 A1 | 3/2017 | Lutz et al. |

FOREIGN PATENT DOCUMENTS

| | | |
|---|---|---|
| EP | 0547504 A2 | 6/1993 |
| EP | 0 547 504 B1 | 2/1996 |
| EP | 0 521 510 B1 | 12/1996 |
| EP | 0 574 803 B1 | 9/1998 |
| EP | 0 798 357 B1 | 8/1999 |
| EP | 1 165 398 B1 | 12/2002 |
| EP | 1 274 332 B1 | 6/2004 |
| EP | 1 247 756 B1 | 12/2004 |
| EP | 1 366 128 B1 | 11/2009 |
| EP | 1 886 942 B1 | 11/2009 |
| EP | 2 155 019 B1 | 4/2011 |
| EP | 2 298 671 B1 | 11/2012 |
| EP | 2 442 699 B1 | 4/2013 |
| JP | 54-111536 A | 8/1979 |
| JP | 2001181588 A | 7/2001 |
| WO | 2004020491 A1 | 3/2004 |
| WO | WO 2010/063644 A1 | 6/2010 |
| WO | WO 2012/110323 A1 | 8/2012 |
| WO | WO 2012/167889 A1 | 12/2012 |
| WO | WO 2013/053655 A1 | 4/2013 |

OTHER PUBLICATIONS

Ossila, Solution-Processing Techniques: A Comparison, Thin Film Coating Solution-Processing Techniques Compared, Aug. 2021; retrieved from www.ossila.com/pagees/solution-processing-techniques-comparison.

ASTM International, "Standard Test Method for Mechanical Seal Strength Testing for Round Cups and Bowl Containers with Flexible Peelable Lids", F2824-10, May 2015, 6 pages.

Third Party Observations submitted in EP Application No. 15722202.7 dated Jul. 6, 2020, 4 pages.

Third Party Observations submitted in EP Application No. 15722202.7 dated Mar. 6, 2020, 3 pages.

* cited by examiner

HEAT-SEALABLE STRUCTURE FOR ALUMINUM DISPOSABLE BEVERAGE-BREWING CONTAINERS

This patent application is a continuation of co-pending U.S. patent application Ser. No. 15/312,401, filed Nov. 18, 2016, which is a 371 national stage entry of PCT Application No. PCT/EP2015/060563, filed May 13, 2015, which claims the benefit of European Patent Application No. 14169970.2, filed May 27, 2014, the entire teachings and disclosure of which are incorporated herein by reference thereto.

FIELD OF THE INVENTION

The present invention relates to a sealable structure used in the art of disposable beverage-brewing containers adapted to extraction machines operating by fluid under pressure and to a method for the preparation of such a structure.

STATE OF THE ART

The preparation of a beverage by means of a disposable single-serve container comprising ingredients for the formation of said beverage, has become very popular. Many brands and food manufacturers now propose their own beverage-brewing container system. One principle consists in injecting liquid in the container for example by perforating an entry wall of the container. The liquid then interacts with the beverage ingredients contained in the container and the resulting beverage extract is drained through the perforations created in or through the container. Usually, a pressure of liquid is created inside the container to promote the extraction of certain aromatic compounds There are several reasons for the use of disposable beverage-brewing containers, especially in the field of coffee extracted under pressure. Worth mentioning are, hygiene, optimal conservation of the coffee, ease of use, better control of the quality of the coffee obtained and good reproducibility of the extraction conditions. Among the variety of disposable containers available, closed cartridges that are preferably substantially impermeable to moisture and preferably to oxygen and that function properly under the pressure of the injected liquid satisfy the above-mentioned requirements.

Disposable beverage-brewing containers have already been disclosed in a considerable number of patents and patent applications such as EP 0 521 510 B1, EP 1 165 398 B1, EP 1 247 756 B1, EP 1 274 332 B1, EP 1 886 942 B1, EP 2 155 019 B1, EP 2 298 671131, EP 2 442 699 B1, U.S. Pat. Nos. 4,136,202, 5,656,311, 8,474,368, WO 2010/063644, WO 2012/110323 and WO 2013/053655.

A typical example of such disposable containers comprises a body, with the beverage-forming ingredients and a foil connected to the body, for example by means of a heat-seal lacquer for closing it. In general, reaching higher pressures in the disposable beverage-brewing container causes a greater transport of flavours from the ingredients, intended for the formation of the beverage, into the injected liquid and therefore a beverage of higher quality. However, these higher pressures may cause a leakage or rupture at the level of the seal between the body and the foil and thus do not allow an optimal retaining of the liquid inside the container.

Furthermore, there is the pressure created by the degassing of the coffee powder during storage. When disposable beverage containers, larger than the nowadays commercial ones are considered, the pressure increase, caused by the degassing of larger quantities of coffee powder, present in said larger containers, becomes more important so that improved heat-sealing materials and heat-sealing conditions are required. Some heat-sealing materials and heat-sealing conditions for sealing different types of materials are disclosed in the patent literature.

EP 0 574 803 B1 discloses an aqueous dispersion, for use as a sealable coating, containing from 5 to 80% by weight of a copolymer A having a glass transition temperature of from 50 to 150° C., and from 95 to 20% by weight of a copolymer B having a glass transition temperature of from −50 to +50° C., the glass transition temperatures of both copolymers differing by at least 20° C.

The copolymers preferably contain main monomers which are esters of (meth)acrylic acid and C1-C20 alkyl alcohols and vinyl esters of carboxylic acids of 1 to 20 carbon atoms. In addition to the main monomers, auxiliary monomers may be used such as vinyl halides, non-aromatic hydrocarbons having 2 to 8 carbon atoms and at least 2 olefinic double bonds, esters of (meth)acrylic acid with alcohols of 1 to 20 carbon atoms, which, in addition to the oxygen atom in the alcohol group, contain at least one further hetero atom and/or contain an aliphatic or aromatic ring, (meth)acrylamide and derivatives thereof and comonomers having hydroxyl functional groups. At least one of the two copolymers containing from 3 to 70% by weight, based on the particular copolymer, of an ethylenically unsaturated C3-C5-mono- or dicarboxylic acid or of the anhydride thereof.

The aqueous dispersion preferably has a solid content of from 20 to 70% by weight. The dispersion can first be applied to a substrate, for example printed or unprinted paper, boxboards or polyvinyl chloride, polyethylene terephthalate, polystyrene or polyolefin films. The amount applied (based on solid content) is in general from 1 to 100, preferably from 3 to 40 g·m$^{-2}$ of coated surface.

The coated substrate is then pressed against a further uncoated substrate by means of sealing jaws. The temperature at the sealing jaws may be from 80 to 250° C., preferably from 100 to 200° C. The contact pressures are in general from 0.1 to 10, in particular from 2 to 6, bar for a contact time of at least 1 second, in general from 2 to 6 seconds.

EP 0 798 357 B1 discloses a method for heat-sealing substrates that comprises pressing together at an elevated temperature two substrates, one of which has been coated with an aqueous dispersion comprising an ethylene copolymer A containing from 20 to 95% by weight of ethylene, from 5 to 80% by weight of an ethylenically-unsaturated acid and from 0 to 60% by weight of auxiliary monomers such as for example C1-010 (meth)acrylate esters, (meth)acrylonitrile, (meth)acrylamide or vinyl esters and a free radically polymerized copolymer B being prepared by emulsion polymerization in the presence of copolymer A.

The copolymer B consists of from 30 to 100% by weight of main monomers chosen from C1-020 (meth)acrylic esters, C8-C12 vinylaromatic compounds, vinyl esters of C1-C20 carboxylic acids and ethylenically unsaturated nitriles, of from 0 to 30% by weight of ethylenically unsaturated acids or anhydrides, of from 0 to 20% by weight of crosslinkable monomers, such as epoxy, hydroxy N-alkylol-, N-alkoxy-, amidine- or at least two non-conjugated ethylenically group comprising radical polymerizable monomers and from 0 to 70% by weight of other monomers such as for example vinyl halides, non-aromatic hydrocarbons having 2 to 8 carbon atoms and at least 2 olefinic double bonds, esters of (meth)acrylic acid with alcohols of 1 to 20 carbon atoms, which, in addition to the oxygen atom in the alcohol group, contain at least one further hetero atom and/or contain an aliphatic or aromatic ring, (meth)acrylamide and derivatives thereof and comonomers having hydroxyl functional groups.

The aqueous dispersion preferably has a solid content of from 20 to 70% by weight. The dispersion can first be applied to a substrate; the coated substrate is then pressed against a further preferably uncoated substrate by means of sealing jaws. The temperature at the sealing jaws may be from 80 to 300° C., preferably from 100 to 200° C. The contact pressures are in general from 0.1 to 10, in particular from 2 to 6 bar for a contact time of at least 0.5 seconds, in general from 1 to 5 seconds.

EP 0 129 178 B1 discloses a method for joining dissimilar substrates which comprises applying to at least one of said substrates a film forming dispersion of (1) a first component which is an olefin polymer or copolymer A, (2) a second component, incompatible with said first component, which is an (meth)acrylic resin X, and (3) a third component which is a block or graft copolymer AX comprising segments A' of olefin polymer sequences, isoprene sequences, or butadiene/isoprene sequences, and segments X' comprising (meth) acrylic sequences, dispersed in an organic solvent system which is an equally effective solvent for said first and second components or a better solvent for said second component than for said first component, said first and second components each having an acid number ranging from 0 to 160 mg KOH per gram of polymer.

The olefin polymers and copolymers corresponding to A which are to be used in accordance with the invention are known per se. They are mainly polymers composed of ethylene, propylene, butylene, and/or other olefins having from 5 to 20 carbon atoms. The polymer X or the segment X' is defined as being formed of poly(meth)acrylate sequences which further optionally comprise from 0 to 50% by weight of monomers such as styrene, alpha-methylstyrene, vinyl chloride, vinyl acetate, vinyl stearate, vinyl methyl ketone, vinyl isobutyl ether, allyl acetate, allyl chloride, allyl isobutyl ether, allyl methyl ketone, dibutyl maleinate, dilauryl maleinate, and dibutyl taconate. The weight ratio between the segments A' and X' generally ranges from 1:20 to 20:1.

The coating compositions in the form of olefin copolymer dispersions contain the graft polymer A X with its sequences A'-X' in concentrations ranging from 1 to 80 weight percent, and preferably from 5 to 10 weight percent.

Suitable solvents, to be used in the solvent system, include ketones such as methyl ethyl ketone and cyclohexanone, alcohols such as isopropanol or n-butanol, ethers such as 1,4-dioxane and esters such as ethyl glycol acetate and propyl acetate. In practice, a polymer content ranging from about 40 to 80 percent is desirable, with polymer contents between 45 and 60 weight percent being regarded as normally attainable.

At an appropriate point during the production process, and preferably on completion of grafting, a binder that is also suitable for the production of primers, for example a vinyl chloride/vinyl acetate/maleic acid copolymer, may be added to the coating composition for further improvement of adhesion to metallic substrates.

The heat-sealable coating compositions can be applied to a wide variety of substrates, including, for example, metals, plastics, glass, paper and textiles. The usual coating methods may be used. After coating, the solvent system is removed by evaporation, optionally with increased air circulation and externally supplied heat. After solvent evaporation, the film thickness will usually range from 1 to 15 microns and preferably ranges from 2 to 10 microns.

Heat sealing may be done conventionally by the use of apparatus developed for the purpose. The coating compositions lend themselves to the heat sealing of metal substrates, for example, and in particular of aluminum, to a number of commonly used synthetic resins such as polypropylene, polystyrene, and polyvinyl chloride.

EP 0 547 504 B1 relates to a process for the heat-sealing of a plastic substrate against a metal substrate by means of a heat-sealable coating composition which comprises a film-forming dispersion built up from at least two different polymer types A and X, each having different adhesive properties, in an organic solvent system L, with the proviso that polymer type A is free from acid groups and polymer type X has a maximum acid number of 120 mg of KOH per gram of polymer, that the dispersion, in addition to the two polymer types A and X, contains a polymer built up from components which correspond to the two polymer types in a weight ratio of 1:20 to 20:1 and that additional primers for the substrates to be coated are not used during the heat-sealing.

Polymer A is a polyolefin, an olefin copolymer, a hydrogenated polyisoprene or a hydrogenated copolymer of butadiene and isoprene, without any acid or other adhesion-promoting group. Polymer B is an acrylic resin comprising at least 50% by weight, preferably at least 80% by weight of C1-O30 (meth)acrylic esters wherein the C1-O30 group is an alkyl group an araliphatic or aromatic group.

US 2008/0292893 relates to a heat-sealable coating system suitable for the sealing of various types of substrate and comprising a film-forming dispersion, characterized in that a polymer type A is present and is a polyester or a polyester mixture, a polymer type B is present and is a (meth)acrylate homo- or/and copolymer, containing standard (meth)acrylates and a polymer type AB is present and is a graft copolymer composed of polymer type A and polymer type B, and the amount of polymer type A is from 5 to 60% by weight, the amount of polymer type B is from 5 to 70% by weight, the amount of polymer type AB is from 5 to 60% by weight, based on the total weight of the polymer types A, B and AB, and that the ratio by weight of the entirety of the polymer types A, B and AB to the weight of the solvent or of the solvent mixture L is from 5:1 to 1:5.

EP 1 366 128 B1 discloses a hot-sealable coating system suitable for the sealing of various types of substrate and composed of a film-forming dispersion made from at least two different polymer types A and B, and of an organic solvent system L, characterized in that the polymer type A is an olefin polymer or an olefin copolymer, the polymer type B is a (meth)acrylate copolymer, containing standard methacrylates and a total of up to 15% of (meth)acrylic acid and/or another polymerizable acid, and the ratio A:B by weight of the two polymer types present is from 0.4 to 2, and the dispersion also comprises a polymer containing components which correspond to the two polymer types A and B.

US 2008/0057205 discloses a heat-sealable coating system suitable for sealing different kinds of substrates and composed of a film-forming dispersion of at least three different polymer types, A, B, AB, C and optionally the polymer types D or $D_A$, and an organic solvent system L, wherein polymer type A is an olefin polymer or olefin copolymer, polymer type B is a (meth)acrylate copolymer containing standard (meth)acrylates and in total up to 15% by weight of (meth)acrylic acid and/or another polymerizable acid, polymer type AB is a graft copolymer of polymer type A and polymer type B, and polymer type C is a polyester or a polyester mixture; optionally there is also a mixture of polymer type D or of different polymer types $D_A$, and the amount of polymer type A is between 15% and 65% by weight, the amount of polymer type B is between 15% and 65% by weight, the amount of polymer type AB is between 15% and 70% by weight, the amount of polymer type C is between 5% and 50% by weight, the amount of polymer type D is between 0% and 10% by weight, the amount of polymer type $D_A$ is between 0% and 10% by weight, based on the total mass of polymer types 4, and the mass ratio of the total of polymer types A, B, AB, C, and D to the mass of the solvent or solvent mixture L is between 5:1 and 1:5.

US 2008/0057205 also discloses a method of sealing heat-sealable substrates comprising applying the above coating system to the substrates and heat sealing the substrates. An aluminum or polyester film is coated with the coating system and sealed to a plastic selected from the group consisting of the plastics polypropylene, polyethylene, polystyrene, polyester and polyvinyl chloride.

To improve the aluminum adhesion, a formulation with polymer type D is an option, i.e. priming the film or adding 0.1% to 10% by weight, even better 0.1% to 5% by weight, of polyvinyl chloride to the lacquer formulation.

Aims of the Invention

The present invention aims to provide a sealable structure for the preparation of a disposable container of coffee or in general soluble or extractable ingredients which allows, upon the introduction of hot pressurised water or other extraction liquid, higher inside pressures without showing leaks or ruptures at the seal layer, thus enabling the preparation of beverages with improved quality. A further aim of the present invention is to provide a sealable structure for the preparation of a disposable container resisting to the pressure increase caused by the degassing of the coffee powder during storage, a phenomenon which becomes more important when containers larger than the nowadays commercial ones are considered. Yet another further aim of the present invention is to provide a method for the manufacturing of said structure.

SUMMARY OF THE INVENTION

The present invention discloses a heat-sealable structure comprising an aluminum foil and a heat-seal lacquer, said structure exhibiting a seal strength, according to ASTM F2824, of more than 23 N/15 mm, preferably more than 25 N/15 mm when heat-sealed to another heat-sealable structure comprising an aluminum foil and the same heat-seal lacquer, the heat-seal lacquers of both structures contacting each other for heat sealing, said seal lacquer comprising a copolymer blend comprising:
from 30 to 80% by weight, preferably 40 to 70% by weight, more preferably from 50 to 60% by weight of a copolymer A based on (meth)acrylate ester (co) polymers, olefin (co)polymers and block or grafted copolymers comprising (met)acrylate ester sequences and olefin sequences,
from 20 to 70% by weight, preferably 30 to 60% by weight, more preferably from 40 to 50% by weight of a copolymer (B) based on vinyl halides, vinyl esters of carboxylic acids and ethylenically unsaturated (poly) carboxylic acids.

Preferred embodiments of the present invention disclose one or more of the following features:
said heat-sealable structure is characterized in that copolymer (A) of the heat-seal lacquer comprises from 5 to 70% by weight of one or more (meth)acrylate ester (co)polymer, from 5 to 70% by weight of one or more olefin (co)polymer) and from 1 to 90% by weight of one or more copolymers comprising (meth)acrylate ester sequences and olefin sequences;
said heat-sealable structure is characterized in that copolymer (B) of the heat-seal lacquer comprises from 70 to 95% by weight of one or more vinyl halide, from 1 to 30% by weight of one or more vinyl esters of C1 to C20 carboxylic acids and from 0.1 to 10% by weight of one or more ethylenically unsaturated (poly)carboxylic acids;
said heat-sealable structure is characterized in that the thickness of the aluminum foil is comprised between 20 and 160 micron, preferably between 30 and 120 micron and that the thickness of the heat-seal layer is comprised between 1 and 20 µm, preferable between 2 and 15 µm,
said heat-sealable structure is characterized in that the aluminum foil is annealed;
said heat-sealable structure comprises one or more stoving paints or varnishes, preferably a polyester-based stoving paint and/or varnish, and/or one or more printings;
said heat-sealable structure is embossed.

The present invention further discloses a method for the preparation of said heat-sealable structure comprising the steps of:
a) supplying an aluminum foil;
b) contacting one side of the aluminum foil with a heat-seal lacquer composition comprising copolymer (A), copolymer (B) and one or more organic solvents and characterized by a solid contend comprised between 20 and 80% by weight;
c) evaporating the solvent of the heat-seal lacquer formulation;
d) cooling down the heat-seal lacquer to form the heat-sealable structure comprising an aluminum foil and a solid heat-seal film.

Preferred embodiments of the method for the preparation of said heat-sealable structure disclose one or more of the following features:
the aluminum foil of step a) is pre-treated;
the aluminum foil of step a) is annealed;
the aluminum foil of step a) comprises one or more stoving paints and/or varnishes and/or one or more printings;
step b) and step c) are repeated at least once before initiating step d);
the heat-seal lacquer formulation of step b) comprises from 5 to 65% by weight, preferably from 7 to 50% by weight and, more preferably from 10 to 40% by weight of copolymer (A), from 5 to 55% weight, preferably from 5 to 45% by weight and more preferably from 5 to 35% by weight of copolymer (B) and from 20 to 80% by weight, preferably from 35 to 75% by weight and more preferably from 50 to 70% by weight of organic solvent;
copolymer (A) of the heat-seal lacquer formulation of step b) comprises 5 to 70% by weight of one or more (meth)acrylate ester (co)polymer, from 5 to 70% by weight of one or more olefin (co)polymer and from 1 to 90% by weight of one or more copolymers comprising (meth)acrylate ester sequences and olefin sequences;

copolymer (B) of the heat-seal lacquer formulation of step b) comprises from 70 to 95% by weight of one or more vinyl halide, from 1 to 30% by weight of one or more vinyl esters of C1 to C20 carboxylic acids and from 0.1 to 10% by weight of one or more ethylenically unsaturated (poly)carboxylic acids;

the one or more organic solvents of the heat-seal lacquer formulation of step b) are selected from the group consisting of esters of aliphatic carboxylic acids with aliphatic alcohols, ketones and aliphatic hydrocarbons;

copolymer (A) of the heat-seal layer formulation of step b) comprises butyl methacrylate and propylene;

copolymer (B) of the heat-seal layer formulation of step b) comprises vinyl chloride, vinyl acetate and fumaric acid;

the one or more organic solvents of the heat-seal layer formulation of step b) comprise butyl acetate, acetone and methyl ethyl ketone.

the heat-sealable structure of step d) is embossed.

The present invention also discloses the use of said heat-sealable structure for the production of lidding foils or capsules.

DETAILED DESCRIPTION OF THE INVENTION

The object of the present invention is to provide a sealable structure for the preparation of a disposable all-aluminum container for coffee or in general soluble or extractable ingredients. Such container comprises an aluminum capsule and an aluminum lidding foil wherein the foil and capsule are connected by means of heat-sealed material, resistant to leakages and ruptures when operated under conditions wherein hot water or in general hot liquid is injected under pressure in the container and resistant to leakages caused by the pressure created by the degassing of the coffee powder upon storage.

It was now surprisingly found that a seal layer comprising from 30 to 80% by weight of a copolymer (A) based on (meth)acrylate ester (co)polymers, olefin (co)polymers and block or graft copolymers comprising (meth)acrylate ester sequences and olefin sequences and from 20 to 70% by weight of a copolymer (B) based on vinyl halides, vinyl esters of carboxylic acids and ethylenically unsaturated (poly)carboxlic acids ensures a firmer bond of the aluminum lidding foil on the aluminum capsule whereby leakage through the seal is avoided during storage and operation conditions.

By "aluminum" is meant a layer containing aluminum as the main constituent such that it can be an aluminum alloy.

The disposable container comprises a cup-shaped capsule, manufactured from deep-drawn aluminum, with an upwardly oriented sidewall and a bottom wall. The capsule terminates by an upper edge raising outwards, onto which the lidding foil is sealed.

The aluminum sheet of the capsule has a thickness comprised between 40 and 140 μm, preferable between 60 and 120 μm. The aluminum sheet of the lidding foil has a thickness comprised between 20 and 60 μm, preferably between 30 and 50 μm.

The aluminum lidding foil is preferably an embossed aluminum foil.

The copolymer (A) of the present invention comprises between 5 and 70% by weight, preferably between 5 and 60% by weight, and more preferably between 5 and 50% by weight of one or more (meth)acrylate ester (co)polymers, between 5 and 70% by weight, preferably between 15 and 60% by weight, and more preferably between 25 and 55% by weight of one or more olefin (co)polymers and from 1 to 90% by weight, preferably from 5 to 80% by weight, more preferably between 10 and 70% by weight of one or more copolymers comprising (meth)acrylate ester sequences and olefin sequences and is further characterized by a weight average molecular weight, measured according to DIN 55672-1 comprised between 150,000 and 500,000 g·mol$^{-1}$, preferably between 200,000 and 400,000 g·mol$^{-1}$, more preferably between 250,000 and 350,000 g·mol$^{-1}$.

The (meth)acrylate ester (co)polymers or (meth)acrylate ester sequences of the block or graft copolymer comprise from 50 to 100% by weight, preferably from 80 to 100% by weight, more preferably from 90 to 100% by weight of (meth)acrylate esters of C1-C20 alkyl alcohols such as for example methyl (meth)acrylate, ethyl (meth)acrylate, propyl (meth)acrylate, n-butyl (meth)acrylate or 2-ethylhexyl (meth)acrylate and from 0 to 50% by weight, preferably from 0 to 20% by weight, more preferably from 0 to 10% by weight or one or more ethylenically unsaturated monomers selected from the group consisting of styrene, alpha-methylstyrene, vinyl chloride, vinyl acetate, vinyl stearate, vinyl methyl ketone, vinyl isobutyl ether, allyl acetate, allyl chloride, allyl isobutyl ether, allyl methyl ketone, dibutyl maleinate, dilauryl maleinate, dibutyl itaconate, vinylpyridine, vinylpyrrolidine, vinylpyrrolidone, vinylcarbazole, vinylimidazole as well as their alkyl derivatives, hydroxy- and dialkylamino alkyl esters of (meth)acrylic and particularly dimethylaminoethyl (meth)acrylate, diethylaminoethyl (meth)acrylate, dimethylamino-propyl (meth)acrylate, hydroxyethyl (meth)acrylate, hydroxy-n-propyl (meth)acrylate or hydroxy-n-butyl (meth)acrylate, nonaromatic hydrocarbons having 2 to 8 carbon atoms and at least 2 olefinic double bonds, e.g. butadiene, isoprene or chloroprene, 2-ethoxyethyl acrylate, 2-butoxyethyl (meth)acrylate, cyclohexyl (meth)acrylate, phenylethyl (meth)acrylate, phenylpropyl (meth)acrylate, (meth)acrylates of heterocyclic alcohols, such as furfuryl (meth)acrylate, (meth)acrylamide and derivatives thereof substituted at the nitrogen by C1-C4-alkyl.

The olefin (co)polymers or olefin sequences of the block or graft copolymer are composed of ethylene, propylene, butylene and/or other alfa-olefins having from 5 to 20 carbon atoms. Propylene polymers are particularly suited.

In general, copolymer (A) is supplied as dispersion in an organic solvent wherein the solid content, according to ISO 3251, of the organic dispersion is comprised between 30 and 60 percent, preferably between 40 and 50 percent. Preferably, the solvent is a solvent mixture comprising one or more esters of aliphatic carboxylic acids with aliphatic alcohols and one or more ketones. An aliphatic carboxylic acid that can be used is acetic acid, propionic acid or butyric acid. Aliphatic alcohols that can be used are ethanol, propanol, isopropanol, n-butanol, 2-butanol, 2-methyl-1-propanol or 2-methyl-2-propanol. Examples of ketones that can be used are acetone or ethyl methyl ketone.

The copolymer (B) of the present invention comprises from 70 to 95% weight, preferably from 80 to 90% by weight of one or more vinyl halides, preferably vinyl chloride and vinylidene chloride from 1 to 30% by weight, preferably from 5 to 20% by weight of one or more obtained from reaction of vinyl alcohol and one or more C1-C20 carboxylic acids, such as for example vinyl laurate, vinyl stearate, vinyl propionate and vinyl acetate, and from 0.1 to 10% by weight, preferably from 0.5 to 5% by weight of one or more ethylenically unsaturated polycarboxylic acids selected from the group consisting of (meth)acrylic acid, maleic acid, fumaric acid, maleic anhydride, fumaric anhydride and itaconic acid.

The copolymer (B) further is characterized by a weight average molecular weight, according to DIN 55672-1 comprised between 40,000 and 100,000 g·mol$^{-1}$, preferably between 50,000 and 90,000 g·mol$^{-1}$, more preferably between 60,000 and 80,000 g·mol$^{-1}$ and an acid number comprised between 1 and 20 mg KOH·g$^{-1}$, preferably between 3 and 15 mg KOH·g$^{-1}$, more preferably between 5 and 10 mg KOH·g$^{-1}$.

Copolymer (A) and copolymer (B) are commercially available from for example Evonik Industries, Wacker Chemie, Nissin Chemical Industries and Dow Chemicals among others.

The seal layer connecting the aluminum lidding foil to the aluminum capsule is characterized by a layer thickness comprised between 1 and 30 µm, preferably between 5 and 20 µm. The seal layer connecting the aluminum lidding foil to the aluminum capsule comprises a homogeneous copolymer blend preferably comprising from 40 to 70% by weight of a copolymer (A) and from 30 to 60% by weight of a copolymer (B), more preferably comprising from 50 to 60% by weight of a copolymer (A) and from 40 to 50% by weight of a copolymer (B).

The seal layer is further characterized by a weight ratio of copolymer (A) to copolymer (B) which is substantially identical at the interface "seal layer-aluminum lidding foil" and at the interface "seal layer—aluminum capsule" and which is comprised between 0.4 and 4.0, preferably between 0.6 and 2.0, more preferably between 0.8 and 1.5.

It was now surprisingly found that for an all-aluminum disposable beverage-brewing container, an increased seal strength, according to ASTM F2824, is observed when the aluminum lidding foil is sealed to the aluminum capsule by means of a seal layer satisfying the composition of the present invention, said seal layer being further characterized by a substantially homogeneous distribution of the copolymers over the entire thickness of the layer and a weight ratio of copolymer (A) to copolymer (B) at the interface "seal layer-aluminum lidding foil" and at the interface "seal layer—aluminum capsule" which is substantially identical.

The higher seal strength, being indicative for higher bond strength, reduces or eliminates leaks due to an increase in pressure caused by the degassing of the coffee during storage, and is especially important for containers, larger than the current commercial ones, containing a larger amount of coffee powder. Furthermore, the increased seal strength allows for a higher pressure of the injected fluid during the brewing process.

On the contrary, for a seal layer not answering the composition of the present invention or for a seal layer comprising copolymer (A) and copolymer (B) but characterized by a heterogeneous distribution over the entire layer thickness, a lower seal strength is observed. This is for example the case for a seal layer characterized by a weight ratio of the copolymer (A) to the copolymer (B) at the interface "seal layer—aluminum lidding foil" or at the interface "seal layer—aluminum capsule" deviating from the claimed values, for example for an interface "seal layer—aluminum capsule" characterized by a weight ratio of the copolymer (A) to the copolymer (B) of lower than 0.4.

The heat-sealable structure comprising the heat-seal layer according to the present invention once heat-sealed to another heat-sealable structure comprising the seal layer according to the present invention is characterized by a seal strength, according to ASTM F2824 of more than 23N/15 mm, preferably more than 25 N/15 mm.

In yet a further embodiment, the present invention provides a method for the production of said heat-sealable structure The seal layer connecting the aluminum lidding foil to the aluminum capsule is obtained from heat sealing the aluminum lidding foil and the aluminum capsule each comprising the heat-seal coating compositions of the present invention on at least one side, by heat-seal methods such as those commonly used in industry.

In order to be applicable by said usual coating methods, a liquid heat-seal formulation with adjusted viscosity profile has to be developed. In general, the dynamic viscosity of the heat-seal formulation is between 1 and 100 Poise at the temperature of application, in general room temperature. Thereto, solvents, in general one or more ketones, are admixed to the copolymers and/or copolymer dispersions.

The resulting heat-seal lacquer formulation, comprising the copolymer (A) and copolymer (B) has a solid content comprised between 20 and 80% by weight, preferably between 25 and 65% by weight more preferably between 30 and 50% by weight.

The heat-seal lacquer formulation of the present invention comprises from 5 to 65% by weight of copolymer (A), 5 to 55% weight of copolymer (B) and 20 to 80% by weight of solvent.

The heat-seal lacquer formulation of the present invention preferably comprises from 7 to 50% by weight of copolymer (A), 5 to 45% weight of copolymer (B) and 35 to 75% by weight of solvent.

The heat-seal lacquer formulation of the present invention more preferably comprises from 10 to 40% by weight of copolymer (A), 5 to 35% weight of copolymer (B) and 50 to 70% by weight of solvent.

In order to dissolve solid copolymers, or to accelerate the dissolving process, the solvent or solvent mixture may be warmed up before, during or after the addition of one or more (co)polymers, taking into account safety regulations well-known to the skilled person when considering organic solvents and heating sources.

The final solution is optionally filtered before pouring into drums or containers for storage purposes or before application on the substrate.

The aluminum strip, intended for capsule and/or lidding foil manufacturing may be pre-treated using conventional trivalent chromium pre-treatment or a chromium-free pre-treatment such as for example disclosed in WO 2012/167889.

The aluminum may be batch or continuously annealed.

The heat-seal lacquer is applied on a first side of the aluminum strip, preferably an annealed aluminum strip, intended for the lidding foil and capsule manufacturing, by using the usual coating methods such as for example roll coating on an industrial scale, and knife coating with a hand coater on a laboratory scale.

A stoving paint and/or varnish may be applied on a second side of the aluminum strip, preferably an annealed aluminum strip, by conventional methods such as for example spray or roller application.

Stoving of the paint or varnish is performed according to the stoving schedule as advised by the supplier. The stoving paint and/or varnish preferably is epoxy or polyester-based. More preferably, a polyester-based stoving paint and/or varnish is used.

In one embodiment of the present invention, the stoving paint and/or varnish is applied and stoved on a second side of the aluminum strip before the application of the heat-seal formulation.

After application of the heat-seal coating formulation, the solvent is stripped by evaporation. This may be done conventionally, optionally with increased air circulation and externally supplied heat. Usually, it is advisable to heat the material in a drying oven, tunnel kiln, etc. The temperature of the drying oven or tunnel kiln depends largely on the nature of the solvent used. As a rule, it ranges from 100 to 380° C. The heating time ranges from less than one second to about one minute. After evaporation of the solvent(s), the heat-seal layer, when cooled down, is transformed in a solid plastic film.

In another embodiment, the stoving paint and/or varnish and the heat-seal coating are simultaneously applied, the heat-seal coating composition to the first side and the stoving paint and/or varnish to the second side of the aluminum strip. For this particular case, stoving of the paint and/or varnish and evaporation of the solvent from the heat-seal coating formulation are performed in the same facility.

In still another embodiment, the heat-seal coating may be applied on a first side of the aluminum strip according to a two-step process, wherein in a first step, part of the final heat-seal coating thickness is applied to a first side of the aluminum strip and the solvent is stripped to form the first heat-seal layer thickness whereupon in a second step, the final heat-seal layer thickness is obtained by further application and solvent stripping of the same heat-seal coating formulation on first heat-seal layer thickness.

The application and solvent stripping of the heat-seal coating formulation in the first step to form the first heat-seal layer thickness may be performed after the application and stoving, respectively, of the stoving paint and/or varnish on a second part of the aluminum strip.

For the heat-seal layer applied according to a two-step process, the ratio of the thickness of the first heat-seal layer to the second heat-seal layer ranges from 0.1 to 1.0, preferably from 0.2 to 0.5. The amount of coating composition applied should be such that a final heat-seal layer film of the desired thickness is obtained. The thickness will usually range from 1 to 20 microns and preferably ranges from 2 to 15 microns.

After application and solvent stripping of the heat-seal coating composition, optionally along with the application and stoving of a stoving paint and/or varnish, for aesthetic and protective purposes, the strip is cooled down and rewound for storage and/or transportation purposes.

Finally, the foil, intended for capsule manufacturing is unwound, lubricated and slit in pieces with suitable dimensions; the lidding foil intended for lidding strip manufacturing is unwound, preferably embossed and slit in strips with suitable dimensions.

Heat sealing may be achieved conventionally by the use of apparatus developed for the purpose. The conditions under which it is done (for example, pressure and temperature) depend to some extent on the nature of the substrates and on the specific coating composition used. The heat-sealing times are usually very short and range from a fraction of a second to several seconds. For the purpose of the present invention the sealing time ranges from 0.1 to 2.0 sec.

The heat-sealing temperature usually ranges from 150 to 350° C., preferably from 180 to 310° C. The heat-sealing pressure normally ranges from 10 to 100 bar and preferably ranges from 20 to 60 bar.

EXAMPLES

The following illustrative examples are merely meant to exemplify the present invention but are not intended to limit or otherwise define the scope of the present invention.

Example 1: Preparation of the Heat-Seal Lacquer Formulation 56.2 parts of methyl ethyl ketone were introduced in a lacquer mixing pot and heated to a temperature of 40° C. Then 20.5 parts of copolymer (B) were slowly added while stirring. When all the copolymer (B) was added, stirring at 40° C. was continued for another 3 hours. Subsequently, the solution was cooled down to 25° C. and filtered. The solution thus obtained has a solid content of 30% by weight. Then, a further quantity of methyl ethyl keton was added, followed by a slow addition of 51.8 parts of an organic dispersion of copolymer (A) in order to have a final solid content of 31% by weight.

Copolymer (A) is an organic dispersion of a copolymer composed of butyl methacrylate and propylene, characterized by a solid content, according to ISO 3251, of 45 percent in a solvent mixture comprising 70 parts of butyl acetate and 30 parts of methyl ethyl ketone and characterized by a glass transition temperature, as measured by Differential Scanning calorimetry according to ISO 11357-1 of −43° C. Copolymer (A) further is characterized by a weight average molecular weight, as measured by Gel Permeation Chromatography according to DIN 55672-1 of 300,000 g·mol$^{-1}$.

Copolymer (B) is composed of vinyl chloride, vinyl acetate and fumaric acid and is characterized by a glass transition temperature, as measured by Differential Scanning calorimetry according to ISO 11357-1 of +74° C., a weight average molecular weight, as measured by Size Exclusion Chromatography using polystyrene as standard about 70,000 g·mol$^{-1}$, an acid number of 7 mg KOH/g and a chlorine content of 47.7% by weight.

Example 2: Manufacturing of the Converted Lidding Foil

The heat-seal lacquer formulation as prepared in Example 1 was applied on a batch-annealed aluminum foil (alloy 9901) of 30 to 40 micron by means of rolling cylinders at 12 gram of solids per square meter. Before application, a further methyl ethyl ketone addition was performed in order to adjust viscosity for roll application. The aluminum foil comprising the heat-seal lacquer formulation subsequently was passed through a gradient heating channel reaching temperatures of up to 260° C. The total dwell time in the heating channel was about 10 seconds. The dwell time in the highest temperature zone, standing at 260° C., was about 2.7 seconds. The foil then was cooled down to about room temperature and rewound. The converted foil was embossed by running through an engraved steel embossing cylinder and a cardboard cylinder. Finally, the embossed foil was slit to form lidding strips with suitable dimensions.

Example 3: Manufacturing of the Converted Capsule Foil

An aluminum foil (alloy 9802) of 100 micron thickness was chromium pre-treated and continuously annealed. A polyester-based stoving paint was applied on the first side of the aluminum foil, while the heat-seal lacquer of Example 1 was applied on the second side by means of rolling cylinders at 2 gram of solids per square meter. The stoving paint and the heat-seal lacquer were stoved and dried respectively in a gradient drying channel reaching temperatures of up to 380° C. The total dwell time in the drying channel was about 10 seconds. The dwell time in the highest temperature zone was about 4.2 seconds. Subsequently, a second part of heat-seal lacquer was applied on the first layer of dried heat-seal lacquer by means of rolling cylinders at 10 gram of solids per square meter and dried in a gradient drying channel reaching temperatures of up to 260° C. The total dwell time in the drying channel was about 10 seconds. The dwell time in the highest temperature zone, standing at 260° C., was about 3.2 seconds. The foil was cooled down to about room temperature and rewound. Finally, the foil was lubricated, using a silicon-based lubricant, and slit to form capsule strips with suitable dimensions.

Example 4: Heat Sealing of Lidding Foil to Capsule

The lidding strip of Example 2 was heat-sealed to the capsule strip of Example 3 by means of a Brugger heat-sealing device. Using the sealing parameters as given below, a seal strength of 27 N/15 mm was measured wherein the type of rupture was a cohesive one. The weight ratio of copolymer A to copolymer B equals 1.1 at both the interface aluminum lidding strip/heat-seal and the interface aluminum capsule strip/heat seal.

Sealing Parameters:
Sealing jaws: upper 10 mm steel/lower 10 mm silicon
Sealing temperature upper and lower jaws: 180° C.
Sealing time: 1 second
Sealing force: 600 Newton
Position: Lidding strip to upper jaw/capsule strip to lower jaw.

Comparative Example 1

Example 4 was repeated with the difference however that the heat-seal lacquer on the aluminum capsule strip of Example 3 is based on copolymer B only. A seal strength of 23 N/15 mm was measured whereby the type of rupture was a cohesive/adhesive one. The weight ratio of copolymer A/copolymer B is about 100 at the interface aluminum lidding strip/heat-seal while it is about 0 at the interface at the interface aluminum capsule strip/heat seal.

Comparative Example 2

Example 4 was repeated yet with the difference that the heat seal lacquer on the converted lidding foil of example 2 and the aluminum capsule strip of example 3 is based on copolymer A only.
A seal strength of 22 N/15 mm was measured whereby the type of rupture was a cohesive/adhesive one.

Example 5: Copolymer Blend Composition

Example 4 was repeated using a heat-seal lacquer as for Example 1, comprising 20.5 parts of copolymer (B) yet with varying parts of Copolymer (A) as reproduced in column 2 of Table 1. In this table, column 1 is the example identification number;
column 3 indicates the weight percentages of copolymer (A);
column 4 indicates the weight percentages of copolymer (B);
column 5 indicates the weight ratio of copolymer (A) to copolymer (B);
column 6 indicates the seal strength value in N/15 mm.

TABLE 1

| | Copolymer (A) (parts of solids) | Copol. (A) | Copol. (B) | (A)/(B) | Seal Strength |
|---|---|---|---|---|---|
| 5(1) | 72.7 | 78 | 22 | 3.5 | 25.2 |
| 5(2) | 40.0 | 66 | 34 | 1.9 | 25.8 |
| 5(3) | 8.8 | 30 | 70 | 0.4 | 25.1 |

Example 6

Deep-drawn capsules, obtained from the capsule strips of Example 3, were filled with 6 g coffee powder. The capsules were sealed by means of a heat-sealing device using the lidding strips of Example 2 to form the container. The sealing temperature was 280° C., the sealing pressure was 1376 N·m$^{-2}$ and the sealing time was 0.3 seconds

Comparative Example 3

Example 6 was repeated using deep-drawn capsules comprising only copolymer (B) as heat-seal layer (see Comparative example 1).

Example 7: Vacuum Chamber Test

Forty containers according to Example 6 and forty containers according to Comparative example 3 were placed in a vacuum chamber at room temperature and a pressure of 100 mbar. Leaking containers are recorded at regular intervals and are reproduced in Table 2.

TABLE 2

| (days) | Example 6 | Comparative example 3 |
|---|---|---|
| 1 | 0 | 0 |
| 15 | 3 | 2 |
| 30 | 3 | 15 |
| 44 | 3 | 21 |
| 61 | 8 | 26 |
| 70 | 10 | 29 |

The above examples clearly prove the increased seal strength observed for ail-aluminum beverage containers comprising a capsule, a lidding strip and a seal layer satisfying the composition according to the present invention.

What is claimed is:
1. A method for creating a heat sealed structure, said heat sealed structure providing a seal strength, according to ASTM F2824, of more than 23 N/15 mm, said method comprising:
contacting one side of a first aluminum foil with a heat-seal lacquer formulation,
contacting one side of a second aluminum foil with the heat-seal lacquer formulation said heat seal lacquer formulation comprising copolymer (A), copolymer (B), and one or more organic solvents, and having a solids content between 20 and 80% by weight;

evaporating the one or more organic solvents of the heat seal lacquer formulation on the first and second aluminum foil;

cooling down the first and second aluminum foils to form a first heat-sealable structure comprising the first aluminum foil and a heat seal lacquer, and a second heat-sealable structure comprising the second aluminum foil and the heat-seal lacquer, said heat seal lacquer comprising:
(a) from 30 to 80% by weight of copolymer (A) based on (meth)acrylate ester (co)polymers, olefin (co)polymers and block or grafted copolymers comprising (meth)acrylate ester sequences and olefin sequences, and
(b) from 20 to 70% by weight of copolymer (B) based on vinyl halides, vinyl esters of carboxylic acids and ethylenically unsaturated (poly)carboxylic acids, contacting the heat-seal lacquer of the first and second heat sealable structures, and heat sealing the first and second heat-sealable structures together at a heat-sealing temperature between 150 to 350° C., a heat-sealing pressure between 1 and 10 bar and a sealing time between 0.1 and 2.0 sec, wherein:
copolymer (A) of the heat seal lacquer comprises butyl methacrylate and propylene;
copolymer (B) of the heat seal lacquer comprises vinyl chloride, vinyl acetate and dicarbonic acid; and
the one or more organic solvents of the heat seal lacquer formulation comprise butyl acetate, acetone and methyl ethyl ketone.

2. The method according to claim 1 wherein at least one of the first and second aluminum foils is annealed, pretreated and comprises one or more organic coatings and/or printings.

3. The method according to claim 1 wherein the heat seal lacquer formulation comprises from 5 to 65% by weight of copolymer (A), 5 to 55% weight of copolymer (B) and 20 to 80% by weight of organic solvent.

4. The method according to claim 1 wherein the heat seal lacquer formulation comprises from 7 to 50% by weight of copolymer (A), 5 to 45% weight of copolymer (B) and 35 to 75% by weight of organic solvent.

5. The method according to claim 1 wherein the heat seal lacquer formulation comprises from 10 to 40% by weight of copolymer (A), 5 to 35% weight of copolymer (B) and 50 to 70% by weight of organic solvent.

6. The method according to claim 1 wherein:
copolymer (A) of the heat seal lacquer formulation comprises 5 to 70% by weight of one or more (meth)acrylate ester (co)polymers, from 5 to 70% by weight of one or more olefin (co)polymers and from 1 to 90% by weight of one or more copolymers comprising (meth)acrylate ester sequences and olefin sequences;
copolymer (B) of the heat seal lacquer formulation of comprises from 70 to 95% by weight of one or more vinyl halides, from 1 to 30% by weight of one or more vinyl esters of C1 to C20 carboxylic acids and from 0.1 to 10% by weight of one or more ethylenically unsaturated (poly)carboxylic acids.

* * * * *